No. 877,509. PATENTED JAN. 28, 1908.
L. G. LANGSTAFF.
LIQUID DISPENSING VESSEL.
APPLICATION FILED DEC. 7, 1906.
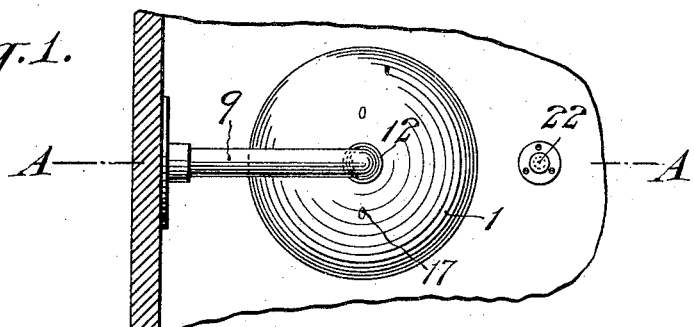
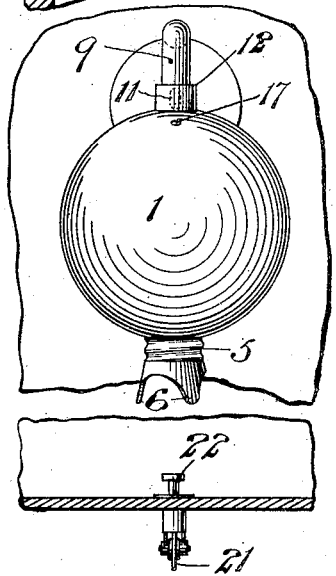
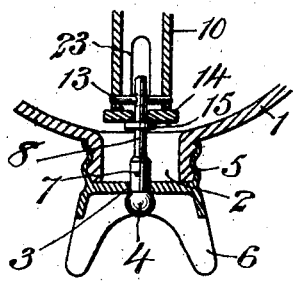
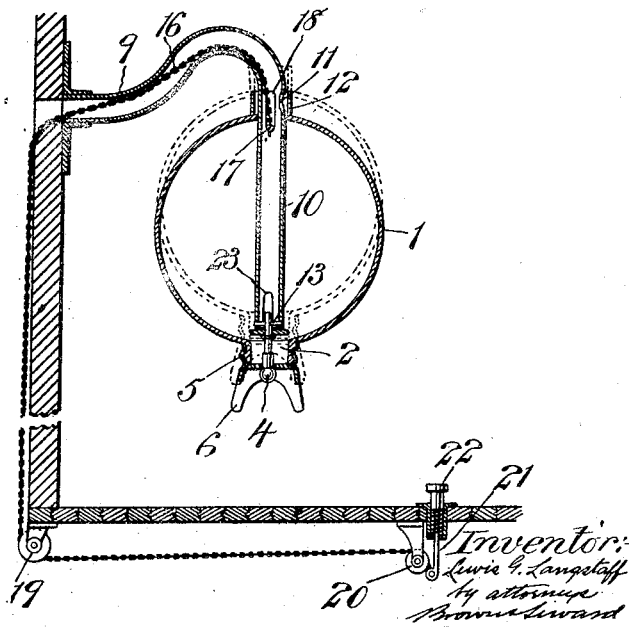
Witnesses:
F. George Barry,
Henry Thieme.
Inventor:
Lewis G. Langstaff
by attorneys
Brown & Seward

UNITED STATES PATENT OFFICE.

LEWIS G. LANGSTAFF, OF NEW YORK, N. Y.

LIQUID-DISPENSING VESSEL.

No. 877,509.     Specification of Letters Patent.     Patented Jan. 28, 1908.

Application filed December 7, 1906. Serial No. 346,709.

*To all whom it may concern:*

Be it known that I, LEWIS G. LANGSTAFF, a citizen of the United States, and resident of the borough of Brooklyn, in the city and State of New York, have invented a new and useful Improvement in Liquid-Dispensing Vessels, of which the following is a specification.

My invention relates to an improvement in liquid dispensing vessels and has for its object to provide a very simple and effective device for insuring the delivery of a predetermined quantity of liquid from a vessel.

The invention is more particularly directed to vessels arranged to dispense liquid soap.

A practical embodiment of my invention is represented in the accompanying drawings, in which Figure 1 is a top plan view of my improved vessel and the means for supporting the same, Fig. 2 is a front view of the same, Fig. 3 is a vertical central section in the plane of the line A—A of Fig. 1, and Fig. 4 is a detail section on an enlarged scale of the lower portion of the vessel and its adjacent parts.

The vessel is herein represented of hollow, spherical form and is denoted by 1. This vessel is provided at its bottom with a liquid dispensing chamber 2 having a discharge port 3 which is opened and closed by a valve 4 as will hereinafter appear.

The bottom of the liquid dispensing chamber 2 in which the discharge port 3 is centrally located consists, in the present instance, of a cap having its upwardly extended annular wall 5 provided with a screw threaded engagement with the exterior wall of the liquid dispensing chamber 2. This cap is further provided with hand engaging lugs 6 projecting downwardly a distance below the head of the valve 4. The stem of the valve 4 is provided, adjacent to its head, with an enlarged portion 7 which closely fits the discharge port 3 and a reduced portion 8 of less diameter than the said port.

The bracket which supports the vessel 1 is of tubular form and comprises the portion 9 exterior to the vessel and the portion 10 within the vessel, which portion 10 forms the piston for ejecting a predetermined quantity of the liquid from the dispensing chamber 2 through the discharge port 3 when the vessel is raised. This hollow piston 10 is provided with a filling opening 11 in its wall exterior to the vessel 1, which opening is normally closed by a sliding collar.

The stem of the valve 4 is secured within the lower end of the piston 10 by a cross pin 13 so arranged as to permit the valve to have a limited lateral movement in all directions so that the valve may be at all times centered with respect to the discharge port 3 of the liquid dispensing chamber 2.

The piston head which, in the present instance is denoted as a washer 14, is supported between the bottom of the piston 10 and a collar 15 on the reduced portion 8 of the valve stem. This washer 14 is permitted a slight lateral movement in all directions with respect to the piston so that the said washer may be centered with respect to the liquid dispensing chamber 2 when the vessel is raised for dispensing a portion of the liquid.

An auxiliary device for raising the vessel by means of the foot is shown, which device comprises a flexible connection 16 as, for instance, a chain, one end of which is extended into the tubular bracket and is secured to a cross pin 17 fixed in the top of the vessel 1, the said cross pin extending through elongated slots 18 in the side walls of the tubular bracket, one of which slots is shown in Fig. 3. The other end of this chain 16 is extended downwardly around a pulley 19 and from thence laterally over a pulley 20 beneath the floor where it is connected to the lower end of a spring actuated foot plunger 21, the foot piece 22 of which projects above the floor. This auxiliary lifting mechanism does not support the vessel, the entire weight of the vessel being supported, when in its normal lowered position, upon the hub of the valve 4 thus insuring an absolutely liquid tight closure of the liquid dispensing chamber discharge port 3. The top of the vessel 1 is merely guided in its vertically movable adjustments on the tubular piston 10. It is to be understood that the interior of the piston 10 is in open communication with the interior of the vessel 1, as, for instance, through openings 23.

In operation, when it is desired to dispense a portion of the liquid from within the vessel, the vessel is raised either by the engagement of the hand with the lugs 6 of the cap on the vessel or by depressing the foot plunger 21, 22. The first part of the upward movement of the vessel will serve to bring the washer 14 which forms the piston head into the mouth of the dispensing chamber 2. During this portion of the upward movement of the chamber, the enlarged portion 7 of the valve stem will prevent the passage of the liquid through the discharge port 3. The further upward movement of the vessel will bring the discharge port 3 opposite the reduced portion 8 of the valve stem thus permitting the washer 14 to positively eject the liquid within the dispensing chamber.

It will be seen that by permitting the valve 4 to have a limited lateral movement it will always be centered with respect to its discharge port and also that by giving the piston head a limited lateral movement it will also always be centered with respect to the dispensing chamber thus absolutely preventing the cramping and binding of the parts during their operation.

It is evident that slight changes might be resorted to in the form, construction and arrangement of the several parts without departing from the spirit and scope of my invention; hence I do not wish to limit myself strictly to the structure herein set forth, but

What I claim is:—

1. A vertically movable liquid containing vessel having a dispensing chamber and discharge port therefor, a stationary piston and a discharge port valve carried by the piston, said valve being arranged to support the weight of the vessel.

2. A vertically movable liquid containing vessel having a dispensing chamber and discharge port therefor, a stationary piston and a discharge port valve carried by the piston movable laterally with respect to the piston, said valve being arranged to support the weight of the vessel.

3. A vertically movable liquid containing vessel having a dispensing chamber and discharge port therefor, a stationary piston having a head arranged to enter said dispensing chamber, said head being movable laterally with respect to the piston and a discharge port valve carried by the piston.

4. A vertically movable liquid containing vessel having a dispensing chamber and discharge port therefor, a rigidly fixed piston having a laterally movable head arranged to enter said dispensing chamber, and a discharge port valve carried by the piston, said valve being arranged to support the weight of the vessel.

5. A vertically movable liquid containing vessel having a dispensing chamber and discharge port therefor, a stationary piston having a head arranged to enter said dispensing chamber and a discharge port valve carried by the piston, said head and valve being movable laterally with respect to the piston.

6. A vertically movable liquid containing vessel having a dispensing chamber and discharge port therefor, a rigidly fixed piston having a laterally movable head arranged to enter said dispensing chamber, and a laterally movable discharge port valve carried by the piston, said valve being arranged to support the weight of the vessel.

7. A vertically movable liquid containing vessel having a dispensing chamber and discharge port therefor, a hollow piston, a discharge port valve carried thereby, said piston having a liquid filling hole exterior to the vessel and an independently movable collar for opening and closing said hole.

In testimony, that I claim the foregoing as my invention, I have signed my name in presence of two witnesses, this third day of October 1906.

LEWIS G. LANGSTAFF.

Witnesses:
FREDK. HAYNES,
C. S. SUNDGREN.